United States Patent
Nakajima et al.

(10) Patent No.: US 9,987,622 B2
(45) Date of Patent: Jun. 5, 2018

(54) HYDRODESULFURIZATION CATALYST FOR DIESEL OIL AND HYDROTREATING METHOD FOR DIESEL OIL

(71) Applicant: Cosmo Oil Co., Ltd., Tokyo (JP)

(72) Inventors: Nobumasa Nakajima, Tokyo (JP); Minoru Hashimoto, Tokyo (JP); Motoki Yoshinari, Tokyo (JP); Takashi Fujikawa, Tokyo (JP)

(73) Assignee: COSMO OIL CO., LTD., Tokyo (JP)

( * ) Notice: Subject to any disclaimer, the term of this patent is extended or adjusted under 35 U.S.C. 154(b) by 300 days.

(21) Appl. No.: 14/779,479

(22) PCT Filed: Mar. 3, 2014

(86) PCT No.: PCT/JP2014/055266
§ 371 (c)(1),
(2) Date: Sep. 23, 2015

(87) PCT Pub. No.: WO2014/156486
PCT Pub. Date: Oct. 2, 2014

(65) Prior Publication Data
US 2016/0059223 A1   Mar. 3, 2016

(30) Foreign Application Priority Data

Mar. 25, 2013  (JP) ................. 2013-062267

(51) Int. Cl.
| C10G 45/12 | (2006.01) |
| B01J 29/16 | (2006.01) |
| B01J 31/34 | (2006.01) |
| B01J 35/10 | (2006.01) |

(52) U.S. Cl.
CPC ............. B01J 29/166 (2013.01); B01J 31/34 (2013.01); B01J 35/1019 (2013.01); B01J 35/1038 (2013.01); B01J 35/1042 (2013.01); B01J 35/1061 (2013.01); C10G 45/12 (2013.01); B01J 2229/186 (2013.01); B01J 2229/20 (2013.01)

(58) Field of Classification Search
CPC .. B01J 29/166; B01J 35/1061; B01J 35/1042; B01J 35/1038; B01J 35/1019; B01J 31/34; B01J 2229/20; B01J 2229/186; C10G 45/12

See application file for complete search history.

(56) References Cited

U.S. PATENT DOCUMENTS

| 6,063,265 | A * | 5/2000 | Chiyoda ................ B01J 29/076 208/216 PP |
| 2003/0173256 | A1 | 9/2003 | Fujikawa et al. |
| 2006/0054536 | A1* | 3/2006 | Fujikawa ................ B01J 23/85 208/216 R |
| 2009/0000990 | A1 | 1/2009 | Toida |

FOREIGN PATENT DOCUMENTS

| JP | H0598271 A | 4/1993 |
| JP | H07232914 A | 9/1995 |
| JP | 2003226519 A | 8/2003 |
| JP | 2008105031 A | 5/2008 |
| JP | 2008173640 A | 7/2008 |
| JP | 2008290071 A | 12/2008 |
| RU | 2314154 C1 | 1/2008 |
| TW | 201124202 A | 7/2011 |
| TW | 201242665 A | 11/2012 |
| WO | 2004054712 A1 | 7/2004 |
| WO | 2005073348 A1 | 8/2005 |

OTHER PUBLICATIONS

International Search Report dated May 27, 2014 in International Application No. PCT/JP2014/055266.
Office Action dated Jun. 15, 2017 in TW Application No. 103107207.
Search Report dated Nov. 20, 2017 in RU Application No. 2015144970/04.
Yin et al., "NiMo/Al2O3 Catalyst Containing Nano-sized Zeolite Y for Deep Hydrodesulfurization and Hydrodenitrogenation of Diesel," Journal of Natural Gas Chemistry, vol. 20, pp. 441-448 (Jul. 1, 2011).
Extended Search Report dated Oct. 19, 2017 in EP Application No. 14775155.6.

* cited by examiner

Primary Examiner — Prem C Singh
Assistant Examiner — Juan C Valencia
(74) Attorney, Agent, or Firm — Panitch Schwarze Belisario & Nadel LLP

(57) ABSTRACT

A hydrodesulfurization catalyst supports one or more metals selected from elements in Group 6 of the Periodic table, one or more metals selected from elements in Group 9 or Group 10 of the same, phosphorus, and an organic acid on a composite oxide support having a specific content of both alumina and HY zeolite having a specific crystallite size. The catalyst includes 10% to 40% by mass of the Group 6 metal, 1% to 15% by mass of the Group 9 or Group 10 metal, and 1.5% to 8% by mass of phosphorus in terms of an oxide based on the catalyst. The catalyst includes 0.8% to 7% by mass of carbon derived from an organic acid and for 1 mole of the Group 9 or Group 10 element metal in terms of an element based on the catalyst, and includes 0.2 to 1.2 moles of the organic acid.

3 Claims, No Drawings

HYDRODESULFURIZATION CATALYST FOR DIESEL OIL AND HYDROTREATING METHOD FOR DIESEL OIL

CROSS-REFERENCE TO RELATED APPLICATION

This application is a Section 371 of International Application No. PCT/JP2014/055266, filed Mar. 3, 2014, which was published in the Japanese language on Oct. 2, 2014, under International Publication No. WO 2014/156486 A1, and the disclosure of which is incorporated herein by reference.

TECHNICAL FIELD

The present invention relates to a hydrodesulfurization catalyst for diesel oil and a hydrotreating method for diesel oil using the same. Specifically, the present invention relates to a hydrodesulfurization catalyst having excellent activity capable of reducing a sulfur content and a nitrogen content in diesel oil compared to the case of using this type of catalyst of the related art.

Priority is claimed on Japanese Patent Application No. 2013-062267, filed Mar. 25, 2013, the content of which is incorporated herein by reference.

BACKGROUND ART

In recent years, there is a global tendency toward stricter quality regulation values for diesel oil so as to improve the atmospheric environment. Particularly, since there is a concern that a sulfur content in diesel oil may adversely influence the durability of after-treatment apparatuses expected as countermeasures against exhaust gas, such as oxidation catalysts, nitrogen oxide ($NO_x$) reduction catalysts, and continuous regenerating type diesel exhaust particle removing filters, it is required to reduce the sulfur content in diesel oil.

Under the above circumstances, it has been emphasized to develop an ultra-deep desulfurization technology for substantially removing most of the sulfur content in diesel oil. The general technology for reducing the sulfur content in diesel oil is to use severer operating conditions for hydrodesulfurization, for example, reaction temperature and liquid hourly space velocity. However, when the reaction temperature is raised, carbonaceous matter precipitates on the catalyst and the activity of the catalyst is rapidly lowered. In addition, when the liquid hourly space velocity is decreased, desulfurization ability is improved but a purification capacity is lowered. Thus, it is necessary to enlarge the scale of a facility.

Consequently, the best way of attaining the ultra-deep desulfurization of diesel oil without using severer operating conditions is to develop a catalyst having excellent desulfurization activity. In recent years, many investigations have been made on types of active metals, methods of active-metal impregnation, improvements of catalyst supports, regulation of catalyst pore structures, activation methods, and the like, and novel catalysts for ultra-deep desulfurization development have been reported. For example, PTL 1 discloses a hydrogenation desulfurization catalyst which supports active metals, phosphorus, and an organic acid on an inorganic oxide support containing alumina or obtained by incorporating zeolite, boria, silica, zirconia or the like into alumina.

CITATION LIST

Patent Literature

[PTL 1] PCT international Publication No. WO 2004/054712

SUMMARY OF INVENTION

Technical Problem

An object of the present invention is to provide a hydrodesulfurization catalyst capable of being produced by a simple method and realizing the ultra-deep desulfurization of a sulfur content in diesel oil without requiring severer operating conditions, and a hydrotreating method for diesel oil using the hydrogenation desulfurization catalyst.

Solution to Problem

Under the circumstances, as a result of intensive investigations, the present inventors have found that when investigations are carried out by combining zeolite having various physical properties with an alumina-based support to cause a hydrodesulfurization reaction, the use of HY zeolite having specific physical properties among various zeolites results in effective progress of a hydrodesulfurization reaction to diesel oil, compared to the case of using other zeolites. As a result of further intensive investigation carried out based on the findings, it has been found that the above object can be attained by depositing a predetermined amount of organic acid with respect to active metals on a support obtained by combining the HY zeolite having specific physical properties with the alumina base and controlling the physical properties of the catalyst such as an average pore diameter. Thus, the present invention has been accomplished.

That is, according to a first aspect of the present invention, there is provided a hydrodesulfurization catalyst for diesel oil which supports one or more metals selected from the group consisting of elements in Group 6 of the long periodic table, one or more metals selected from the group consisting of elements in Group 9 or 10 of the long periodic table, phosphorus, and an organic acid on a composite oxide support containing 80% by mass to 99.5% by mass of alumina, and 0.5% by mass to 20% by mass of HY zeolite, the catalyst including: 10% by mass to 40% by mass of one or more metals selected from the group consisting of elements in Group 6 in terms of an oxide based on the catalyst; 1% by mass to 15% by mass of one or more metals selected from the group consisting of elements in Group 9 or 10 in terms of an oxide based on the catalyst; 1.5% by mass to 8% by mass of phosphorus in terms of an oxide based on the catalyst; 0.8% by mass to 7% by mass of carbon derived from the organic acid in terms of an element based on the catalyst; and 0.2 moles to 1.2 moles of the organic acid per 1 mole of one or more metals selected from the group consisting of elements in Group 9 or 10 of the long periodic table, in which a specific surface area measured by a nitrogen adsorption method is from 110 $m^2/g$ to 300 $m^2/g$, a pore volume measured by a mercury penetration method is from 0.3 ml/g to 0.6 ml/g, an average pore diameter measured by a mercury penetration method is from 6.5 nm to 14 nm, and the HY zeolite has (a) a $SiO_2/Al_2O_3$ (molar ratio) of 3 to 10, (b) a crystal lattice constant of 2.435 nm to 2.465 nm, (c) a molar ratio of Al in the zeolite framework to total Al of 0.2 to 0.9, and (d) a crystallite diameter of 30 nm to 100 nm.

Further, according to a second aspect of the present invention, there is provided a hydrotreating method for diesel oil including: subjecting a diesel oil fraction to a catalytic reaction under the presence of the hydrodesulfurization catalyst according to the first aspect.

Advantageous Effects of Invention

Since the hydrodesulfurization catalyst for diesel oil according to the present invention has high desulfurization activity, a sulfur content in a diesel oil fraction can be significantly reduced.

In addition, since the reaction conditions can be set to be almost the same as or be milder than the reaction conditions in the hydrotreating of the related art, the hydrodesulfurization catalyst for diesel oil according to the present invention can be diverted to a hydrodesulfurization catalyst which has been used in the related art without greatly modifying the conventional apparatuses.

Further, a diesel oil base material having a low sulfur content can be easily supplied by the hydrotreating method for diesel oil using the hydrodesulfurization catalyst for diesel oil according to the present invention.

DESCRIPTION OF EMBODIMENTS

A hydrogenation desulfurization catalyst for diesel oil according to the present invention (hereinafter, sometimes also referred to as a "catalyst according to the present invention") is a catalyst which supports one or more metals selected from the group consisting of elements in Group 6 of the long periodic table (hereinafter, sometimes referred to as a "Group 6 metal"), one or more metals selected from the group consisting of elements in Group 9 or 10 of the long periodic table (hereinafter, sometimes referred to as a "Group 9 or 10 metal"), phosphorus, and an organic acid on a composite oxide support containing alumina and HY zeolite having specific physical properties, and is a hydrodesulfurization catalyst for hydrocarbon oil having a specific surface area, a pore volume, and an average pore diameter within specific ranges. A hydrodesulfurization catalyst having a long life which makes a hydrotreating with a sufficient degree of desulfurization possible even under relatively mild desulfurization conditions can be obtained by using an alumina support including HY zeolite having specific physical properties and controlling physical properties such as a specific surface area, a pore volume, and an average pore diameter to be within specific ranges.

<HY Zeolite>

The HY zeolite used in the catalyst according to the present invention has the following physical properties of (a) to (d):

(a) the $SiO_2/Al_2O_3$ (molar ratio) is from 3 to 10;
(b) the crystal lattice constant is from 2.435 nm to 2.465 nm;
(c) the molar ratio of Al in zeolite framework with respect to total Al is from 0.2 to 0.9; and
(d) the crystallite diameter is from 30 nm to 100 nm.

(a) $SiO_2/Al_2O_3$ (Molar Ratio)

The $SiO_2/Al_2O_3$ (molar ratio) can be measured by chemical composition analysis through ICP spectroscopy.

The bulk $SiO_2/Al_2O_3$ (molar ratio) by the chemical composition analysis of the HY zeolite used in the catalyst according to the present invention is from 3 to 10 and preferably from 5 to 8. When the $SiO_2/Al_2O_3$ (molar ratio) is 3 or greater, a sufficient number of active spots can be provided so that isomerization of alkyl groups or hydrogenation of benzene rings in substances which are difficult to remove is sufficiently carried out. In addition, when the $SiO_2/Al_2O_3$ (molar ratio) is 10 or smaller, a feedstock oil (diesel oil) is hardly cracked and the liquid yield can be inhibited from being lowered.

The HY zeolite used in the present invention basically has the same crystalline structure as that of natural faujasite and has a composition shown below as oxide.

$$(0.02 \text{ to } 1.0)R_2/mO \cdot Al_2O_3 \cdot (5 \text{ to } 11)SiO_2 \cdot (5 \text{ to } 8)H_2O \quad \text{[Chem. 1]}$$

R represents Na, K, another alkaline metal ion, or an alkaline earth metal ion and m represents a valence of R (b) Crystal Lattice Constant The crystal lattice constant (unit cell dimension) of HY zeolite can be measured using an X-ray diffraction apparatus (XRD). Here, the "crystal lattice constant of HY zeolite" refers to a size of a unit constituting zeolite.

The crystal lattice constant of the HY zeolite used in the present invention is from 2.435 nm to 2.465 nm and preferably from 2.440 nm to 2.460 nm. When the crystal lattice constant is 2.435 nm or greater, the number of Al atoms (the number of aluminum atoms) required for accelerating isomerization of alkyl groups or hydrogenation of benzene rings in substances which are difficult to remove is suitable and when the crystal lattice constant is 2.465 nm or smaller, the feedstock oil on acid sites is inhibited form being cracked and carbon precipitation which is a main cause of activity lowering can be inhibited.

(c) Molar Ratio of Al in Zeolite Framework to Total Al

The molar number of aluminum atoms in the zeolite framework to the total number of aluminum atoms of the zeolite can be calculated from $SiO_2/Al_2O_3$ (molar ratio) by chemical composition analysis and the crystal lattice constant using the following equations (A) to (D). The equation (A) is an equation described in H. K. Beyer et al., J. Chem. Soc., Faraday Trans. 1, (81), 2899 (1985).

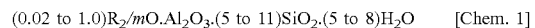

$$N_{A1}=(ao-2.425)/0.000868 \quad \text{Equation (A)}$$

In the equation (A), ao represents a crystal lattice constant/nm, $N_{A1}$ represents the number of Al atoms per unit lattice, 2.425 represents a crystal lattice constant when the total Al atoms in a unit lattice framework are detached from the framework, and 0.000868 represents an inclination of ($ao=0.000868N_{A1}+2.425$) which is a calculated value obtained from an experiment and obtained when ao and $N_{A1}$ are adjusted by a linear equation.

$$[(Si/Al) \text{ calculation equation}]=(192-N_{A1})/N_{A1} \quad \text{Equation (B):}$$

In the equation (B), 192 is the number of atoms of (Si+Al) per crystal lattice constant of Y type zeolite.

$$[(Si/Al) \text{ chemical composition analytical value}]= [(SiO_2/Al_2O_3) \text{ molar ratio}]/2 \quad \text{Equation (C):}$$

$$[\text{Al in zeolite framework}]/[\text{total Al}]=[(Si/Al) \text{ chemical composition analytical value}]/[(Si/Al) \text{ calculation equation}] \quad \text{Equation (D):}$$

The molar ratio of the aluminum atoms in the zeolite framework to the total aluminum atoms of the HY zeolite used in the present invention ([Al in zeolite framework]/[total Al]) is from 0.2 to 0.9 and preferably from 0.4 to 0.7. When the molar ratio [Al in zeolite framework]/[total Al] is within this range, acid sites in which proper isomerization or hydrogenation can be achieved are formed. Thus, it is possible to obtain desired desulfurization activity.

(d) Crystallite Diameter

The crystallite diameter of the HY zeolite used in the catalyst according to the present invention is measured by using an X-ray diffraction apparatus and defined as shown in the following (1) to (4);

(1) the diffraction peak of zeolite is calculated by using an X-ray diffraction apparatus;

(2) the respective half-value widths of a (533) plane, a (642) plane, and a (555) plane are obtained from peaks corresponding to the (533) plane, the (642) plane, and the (555) plane;

(3) the respective half-value widths of the (533) plane, the (642) plane, and the (555) plane are substituted into the Scherrer equation (E) to obtain the size of each plane; and (4) the average value of three planes obtained in the (3) is defined as a crystallite diameter of the zeolite.

$$D = K\lambda/\beta \cos\theta \quad \text{Equation (E):}$$

In the equation (E), D represents a crystallite diameter (A) of zeolite,

K represents a Scherrer constant, $\lambda$ represents a wavelength of X-ray (nm), $\eta$ represents a half-value width (rad), and $\theta$ represents a diffraction angle (°).

The crystallite diameter of the HY zeolite used in the present invention, which is obtained from the equation (E), is from 30 nm to 100 nm and preferably from 45 nm to 95 nm. When the crystallite diameter of the zeolite is within the above range, carbon deposition which is a main cause of activity lowering can be inhibited without impairing a function of accelerating isomerization or hydrogenation. In addition, the liquid yield can be inhibited from being lowered due to a decomposition reaction.

<Composite Oxide Support>

In the catalyst according to the present invention, an inorganic oxide having alumina as a main component and including HY zeolite is used as a support. Specifically, the catalyst according to the present invention is a catalyst which supports a Group 6 metal, a Group 9 or 10 metal, phosphorus, and an organic acid on a composite oxide support containing, as an essential component, 80% by mass to 99.5% by mass of alumina, and 0.5% by mass to 20% by mass of HY zeolite based on the support.

The amount of HY zeolite blended into the composite oxide support is preferably from 2% by mass to 10% by mass and more preferably from 4% by mass to 8% by mass based on the support. When the amount of HY zeolite blended is too small or too large, molding of the catalyst is difficult. In addition, when the amount of HY zeolite blended is too small, Bronsted acid sites or Lewis acid sites, which are acid sites on the catalyst may not be sufficiently imparted. When the amount of HY zeolite blended is too large, high dispersion of Mo may be inhibited.

As the alumina used in the support of the catalyst according to the present invention, various aluminas, such as α-alumina, β-alumina, γ-alumina, and δ-alumina can be used. However, an alumina which is porous and has a large specific surface area is preferred. Among these examples, γ-alumina is suitable. The purity of the alumina is about 98% by mass or higher and an alumina having about 99% by mass or higher is preferably suitable. Examples of the impurities in the alumina include $SO_4^{2-}$, $Cl^-$, $Fe_2O_3$, and $Na_2O$. However, the smaller the amount of these impurities is, the more preferable it is. Specifically, the total amount of the impurities is 2% by mass or less and preferably 1% by mass or less. The content of each impurity is preferably as follows: $SO_4^{2-}$<1.5% by mass, and $Cl^-$, $Fe_2O_3$, $Na_2O$<0.1% by weight.

The specific surface area, pore volume, and average pore diameter of the alumina support (composite oxide support) containing the HY zeolite are not particularly limited. However, in order to obtain a catalyst having high hydrodesulfurization activity with respect to diesel oil, the specific surface area is about from 230 $m^2/g$ to 500 $m^2/g$ and preferably about from 300 $m^2/g$ to 450 $m^2/g$, the pore volume is about from 0.5 ml/g to 1.0 ml/g and preferably about from 0.6 ml/g to 1.0 ml/g, and the average pore diameter is about from 6 nm to 12 nm and preferably about from 6.5 nm to 11 nm. The reason is as follows.

It is considered that in an impregnation solution, the Group 6 metal and the Group 9 or 10 metal form complexes (the Group 6 metal is coordinated to phosphoric acid to form a heteropoly acid and the Group 9 or 10 metal is coordinated to an organic acid to form an organic metal complex). Therefore, in the case in which the specific surface area of the support is too small, it is difficult to highly disperse each metal at impregnation because of the bulkiness of the complex. As a result, it would be difficult to precisely control the formation of the above active sites (such as a CoMoS phase, and a NiMoS phase) even when the obtained catalyst is subjected to a sulfidation treatment. In the composite oxide support, when the specific surface area is about 230 $m^2/g$ or greater, the active metals show good dispersibility and a catalyst having high desulfurization activity can be obtained.

On the other hand, when the specific surface area is 500 $m^2/g$ or smaller, the support does not have such an extremely small pore diameter and thus provides a catalyst which also does not have a small pore diameter, so that this case is preferable. When the pore diameter of the catalyst is small, desulfurization activity thereof decreases because the diffusion of sulfur compounds into the catalyst pores is insufficient.

In the composite oxide support, when the amount of the solvent penetrating into the pores in the pore volume is too small, the compounds of active metals show poor solubility, resulting in lowered metal dispersibility to provide a catalyst having poor activity. In the case in which the pore volume is about 0.5 ml/g or greater and a catalyst is prepared by the ordinary impregnation method, a sufficient amount of the solvent can penetrate into the pore volume. In addition, a technique of adding a large amount of an acid such as nitric acid is effective for enhancing the solubility of the compounds of active metals. However, when the acid is added in an amount too large, the support has a very small specific surface area and lowers desulfurization performance in some cases. When the pore volume of the composite oxide support is about 1.0 ml/g or smaller, the support has a sufficient specific surface area and the compounds of active metals show good dispersibility. Thus, a catalyst having high desulfurization activity can be obtained.

When the pore diameter of the catalyst is small, the diffusion of sulfur compounds into the catalyst pores is insufficient and thus the desulfurization activity may be lowered. When the pore diameter of the composite oxide support is about 6 nm or larger, the active metals are supported on the composite oxide support and thus a catalyst having a sufficient pore diameter can be obtained. On the other hand, when the specific surface area of the catalyst is small, the active metals show poor dispersibility and the desulfurization activity may be lowered. When the pore diameter of the composite oxide support is about 12 nm or smaller, a catalyst having a sufficient specific surface area can be obtained.

The composite oxide support may contain inorganic oxides such as boria, silica, silica-alumina, titania, and zirconia, other than alumina and HY zeolite within a range satisfying the physical properties of the support or the physical properties of the final catalyst.

The composite oxide support according to the present invention is prepared through calcination at a temperature from 580° C. to 700° C. for 1.5 hours to 3 hours. The catalyst according to the present invention is prepared by merely drying at 200° C. or lower after active components have been supported on the composite oxide support, as will be described later. Accordingly, the mechanical properties of the catalyst (such as side crushing strength and compacted bulk density) which will be described later should be obtained by calcining the composite oxide support. Therefore, when calcination is carried out at a temperature lower than 580° C. for a period shorter than 1.5 hours, sufficient mechanical strength cannot be obtained. Even when calcination is carried out at a high temperature higher than 700° C. for a prolonged period about longer than 3 hours, not only the effects of calcination are saturated but also densification may occur so that the properties of the composite oxide support, such as specific surface area, pore volume, and average pore diameter are lowered.

<Hydrodesulfurization Catalyst for Diesel Oil>

In the catalyst according to the present invention, only one of the Group 6 metals may be supported on the composite oxide support or two or more of the Group 6 metals may be supported on the composite oxide support. As the Group 6 metal supported on the composite oxide support, molybdenum and tungsten are preferable and molybdenum is particularly preferable.

The content of the Group 6 metal of the catalyst according to the present invention is from 10% by mass to 40% by mass and preferably about from 16% by mass to 35% by mass in terms of an oxide based on the catalyst. The content of 10% by mass or greater of the Group 6 metal in terms of an oxide based on the catalyst is sufficient for producing the effect attributable to the Group 6 metal and is preferable. In addition, when the content is 40% by mass or lower in terms of an oxide based on the catalyst, aggregation of the Group 6 metal compound does not occur in the step of Group 6 metal impregnation (supporting), resulting in good dispersibility of the Group 6 metal. Further, enhanced catalytic activity is observed because the content of the Group 6 metal does not exceed the limit for efficient dispersion and the surface area of the catalyst does not considerably decrease, so that this case is preferable.

In the catalyst according to the present invention, only one of the Group 9 and 10 metals may be supported on the composite oxide support or two or more of the Group 9 and 10 metals may be supported on the composite oxide support. As the Group 9 and 10 metals supported on the composite oxide support, cobalt and nickel are preferable.

The content of the Group 9 or 10 metal of the catalyst according to the present invention is from 1% by mass to 15% by mass and preferably about from 3% by mass to 8% by mass in terms of an oxide based on the catalyst. When the content of the Group 9 or 10 metal is 1% by mass or greater in terms of an oxide based on the catalyst, active sites attributable to the Group 9 and 10 metals can be sufficiently obtained and hence this case is preferable. When the content of the Group 9 or 10 metal is 15% by mass or lower in terms of an oxide based on the catalyst, aggregation of the Group 9 or 10 metal compound does not occur in the step of Group 9 or 10 metal impregnation (supporting), resulting in good dispersibility of the Group 9 or 10 metal. In addition, it is considered that species of CoO, NiO, and the like, which are precursors for species such as $Co_9S_8$ and $Ni_3S_2$, which are inactive metal species of the Group 9 and 10 metals, and further a Co spinel species, Ni spinel species or the like incorporated in support lattices are not formed. Accordingly, improved catalytic activity is observed and thus this case is preferable.

When both cobalt and nickel as the Group 9 and 10 metals are supported on the support, the metals are desirably used such that a ratio of Co/(Ni+Co) is within a range from 0.6 to 1 and more preferably within a range from 0.7 to 1. When the ratio is 0.6 or greater, coke precursor is not formed on Ni, and thus, the catalytically active sites are not covered with coke. As a result, the activity does not decrease and this case is preferable.

The optimal mass ratio between the Group 9 or 10 metal and the Group 6 metal, which are contained in the respective amounts shown above, is such that the ratio of [Group 9 or 10 metal]/([Group 9 or 10 metal]+[Group 6 metal]) in terms of an oxide is preferably from 0.1 to 0.25. When the ratio is 0.1 or greater, the formation of a CoMoS phase, NiMoS phase, or the like, which are thought to be active sites for desulfurization, is not inhibited, and the degree of improvement of desulfurization activity is enhanced. Thus, this case is preferable. When that ratio is 0.25 or smaller, the formation of the aforementioned inactive form of cobalt or nickel (species of $Co_9S_8$ or $Ni_3S_2$) is inhibited and catalytic activity is improved. Thus, this case is preferable.

The content of phosphorus of the catalyst according to the present invention is from 1.5% by mass to 8% by mass, preferably from 2% by mass to 6% by mass, and more preferably from 3% by mass to 6% by mass in terms of an oxide based on the catalyst. When the content of phosphorus is 1.5% by mass or greater, a heteropoly acid of the Group 6 metal is formed on the surface of the catalyst and the phosphorus not forming the heteropoly acid disperses on the surface of the alumina. Thus, it is assumed that highly dispersed polylayer $MoS_2$ crystals form in the step of presulfidation and the aforementioned active sites for desulfurization can be sufficiently arranged. Thus, this case is preferable. Particularly, in order to enable the catalyst to have laminated layers of the Group 6 metal disulfide such as molybdenum disulfide in a number of 2.5 to 5 on average after the above presulfidation, the content of phosphorus is necessarily set to 1.5% by mass or higher. On the other hand, when the amount of phosphorus is 8% by mass or less, the Group 6 metal sufficiently forms a heteropoly acid on the surface of the catalyst and the phosphorus not forming the heteropoly acid disperses on the alumina surface and does not cover the above high-quality active sites for desulfurization during the step of presulfidation so that the activity is not lowered and thus this case is preferable.

When molybdenum is used as the Group 6 metal, in the content of the phosphorus component, the optimal mass ratio between molybdenum and phosphorus as active metals is such that the ratio of $[P_2O_5]/[MoO_3]$ is preferably from 0.07 to 0.3 and more preferably from 0.09 to 0.25. When the mass ratio between molybdenum and phosphorus is 0.07 or greater, from two reasons that unification of cobalt and molybdenum is achieved and laminated layers of molybdenum disulfide can be formed after sulfidation, and thus active sites for desulfurization, CoMoS phase and NiMoS phase, especially Type II sites of CoMoS phase and NiMoS phase which exhibit high desulfurization activity among the active sites for desulfurization are easily obtained and thus a catalyst having high activity is produced. Thus, this case is preferable. On the other hand, when the mass ratio between molybdenum and phosphorus is 0.3 or smaller, the surface area and pore volume of the catalyst is not reduced and the activity of the catalyst is not lowered. Further, the activity deterioration is less apt to occur owing to no increase of the acid amount and no occurrence of carbon precipitation. Thus, activity deterioration is hardly caused and hence this case is preferable.

The content of carbon derived from the organic acid of the catalyst according to the present invention is from 0.8% by mass to 7% by mass, preferably from 1% by mass to 6% by mass, and more preferably from 1.5% by mass to 6% by mass in terms of an element based on the catalyst. The carbon is carbon derived from an organic acid, preferably citric acid. When the content of carbon derived from the organic acid is 0.8% by mass or greater, the Group 9 or 10 metal sufficiently forms a complex compound with the organic acid on the surface of the catalyst. In this case, it is presumed that the Group 6 metal which is not in the form of a complex in the step of presulfidation is sulfidized prior to the sulfidation of the Group 9 or 10 metal in the step of presulfidation, whereby active sites for desulfurization (such as a CoMoS phase and NiMoS phase) are sufficiently formed and thus $Co_9S_8$ species or $Ni_3S_2$, which are inactive species of the Group 9 and 10 metals, and a cobalt spinel, nickel spinel or the like species incorporated in support lattices are not formed, so that this case is preferable.

The content of carbon derived from the organic acid of the catalyst according to the present invention is 7% by mass or lower, and thus the Group 9 or 10 metal can sufficiently form a complex compound with the organic acid on the surface of the catalyst. On the other hand, the Group 6 metal does not form a complex compound with the organic acid, and the excess carbon derived from the organic acid does not remain on the surface of the catalyst. Thus, this case is preferable. When the Group 6 metal has formed a complex with the organic acid, the Group 6 metal is sulfidized simultaneously with the sulfidation of the Group 9 or 10 metal at the time of activation (sulfidation). It is presumed that in the sulfidation, active sites for desulfurization (such as CoMoS phase and NiMoS phase) are not efficiently formed and this leads to the formation of $Co_9S_8$ species or $Ni_3S_2$, which are inactive species of the Group 9 and 10 metals. Further, the excess carbon is a cause of activity lowering because carbon covers desulfurization-active sites during the stage of sulfidation as a catalyst poison.

In order to enhance hydrogenation activity and desulfurization activity to diesel oil, the catalyst according to the present invention prepared as described above should have the composition described above and the specific surface area, the pore volume and the average pore diameter have to be controlled to have the following values. When the physical properties such as a specific surface area, a pore volume and a average pore diameter are controlled to be within specific ranges, it is possible to obtain an high-performance desulfurization catalyst which facilitates achievement of an ultra-deep desulfurization reaction without using severe reaction conditions even under relatively mild desulfurization conditions.

The specific surface area of the catalyst according to the present invention [Braunauer-Emmett-Tailor specific surface area (BET specific surface area) measured by the nitrogen adsorption method] is from 110 m$^2$/g to 300 m$^2$/g, preferably from 120 m$^2$/g to 200 m$^2$/g, and more preferably from 130 m$^2$/g to 180 m$^2$/g. When the specific surface area is 110 m$^2$/g or greater, it is considered that the Group 6 metal and the Group 9 or 10 metal, which each are thought to form complexes (the Group 6 metal has coordinated to phosphoric acid to form a heteropoly acid, while the Group 9 or 10 metal has coordinated to the organic acid to form an organometallic complex), and each is in a sufficiently highly dispersed state on the surface of the catalyst even when each metal complex is bulky. As a result, it is easy to precisely control the formation of the aforementioned active sites through a sulfidation treatment, whereby a catalyst having high desulfurization activity is produced. Therefore, this case is preferable. On the other hand, when the specific surface area is 300 m$^2$/g or smaller, the pore diameter become not so very small and the pore diameter of the catalyst is not so small. Thus, at the time of hydrotreating, the diffusion of sulfur compounds into the catalyst pores is sufficient and desulfurization activity is not lowered. Accordingly, this case is preferable.

The pore volume of the catalyst according to the present invention measured by the mercury penetration method is from 0.3 ml/g to 0.6 ml/g and preferably from 0.3 ml/g to 0.5 ml/g. When the pore volume is 0.3 ml/g or greater, the catalyst has sufficient desulfurization activity at the time of hydrotreating because the diffusion of sulfur compounds in the catalyst pores is sufficient, so that this case is preferable. On the other hand, when the pore volume is 0.6 ml/g or smaller, the catalyst does not have a very small specific surface area and dispersibility of the active metals is not lowered. The obtained catalyst has high desulfurization activity and thus this case is preferable.

The average pore diameter of the catalyst according to the present invention, as measured from a pore size distribution obtained by the mercury penetration method, is about from 6.5 nm to 14 nm, preferably from 9 nm to 13 nm, and more preferably from 9.6 nm to 13 nm. When the average pore diameter is 6.5 nm or greater, reactants easily diffuse into the pores and thus desulfurization reactions proceed efficiently, so that this case is preferable. On the other hand, when the average pore diameter is 14 nm or smaller, diffusion into the pores is good and the internal-surface area of the pores is not reduced. Thus, effective specific surface area of the catalyst does not decrease and the obtained catalyst has an enhanced activity. Thus, this case is preferable.

In order to increase the effective number of pores satisfying the pore requirements described above, the pore diameter distribution of the catalyst, that is, the proportion of pores having a diameter within a range of average pore diameter±1.5 nm is 30% to 75% of the total pore volume, preferably 35% to 70% of the total pore volume, and more preferably 40% to 60% of the total pore volume. When the proportion of pores having a diameter within a range of average pore diameter±1.5 nm is 75% or less, the compound to be desulfurized is not limited to specific sulfur compounds and all the sulfur compounds can be desulfurized, so that this case is preferable. On the other hand, when the proportion is 30% or greater, pores not contributing to desulfurization of diesel oil do not increase and, as a result, the desulfurization activity does not significantly decrease. Thus, this case is preferable.

Moreover, the catalyst according to the present invention is preferably one in which an average number of the laminated layers of the Group 6 metal disulfide such as molybdenum disulfide observed through a transmission electron microscope after a sulfidation treatment is from 2.5 to 5. That is, these layers of molybdenum disulfide or the like, which are formed on the composite oxide support, not only serve to increase the contact area of the catalyst but also have active sites, for example, a CoMoS phase, NiMoS phase, or the like, formed therein. Catalysts in which the average number of such laminated layers is 2.5 or greater do not have such a large proportion of lowly active Type I sites of a CoMoS phase, NiMoS phase, or the like and hence have high activity. Thus, this case is preferable. On the other hand, highly active Type II sites of a CoMoS phase, NiMoS phase, or the like are formed and the absolute number of the active sites is not reduced in catalysts in which the average number of laminated layers is 5 or less. Consequently, these catalysts exhibit high activity and hence this case is preferable.

Furthermore, the in-plane-direction length of disulfide layers of the Group 6 metals such as molybdenum disulfide, observed through a transmission electron microscope, is suitably from 1 nm to 3.5 nm, and preferably from 2 nm to 3.5 nm, on the average. The average in-plane-direction length of 1 nm or longer of disulfide layers of the Group 6 metals is preferable because the Group 9 and 10 metals such as cobalt and nickel can form a square pyramid type pentacoordinate sulfur structure owing to presence of molecules of molybdenum disulfide or the like not only as single molecules, and thus a CoMoS phase, NiMoS phase, or the like serving as active sites can be formed. The average in-plane-direction length of 3.5 nm or shorter of disulfide layers of the Group 6 metals is also preferable because the absolute number of edge portions is not reduced owing to no increase in size of molybdenum disulfide crystals or the like and thus active sites of a CoMoS phase, NiMoS phase, or the like can be secured in a sufficient number.

As images of the transmission electron microscope for the analysis, those capable of visually observing the crystals of the Group 6 metal disulfide such as molybdenum disulfide in the number of 200 or more per field of view are used.

The catalytic properties of the catalyst according to the present invention are not particularly limited and various shapes typically used for this type of catalyst, for example, a cylindrical shape, a trilobe shape, and a quadlobe shape can be employed. Regarding the size of the catalyst according to the present invention, typically, the diameter is preferably about from 1 mm to 2 mm and the length is preferably about from 2 mm to 5 mm.

The mechanical strength of the catalyst according to the present invention, in terms of side crushing strength (SCS), is preferably about 2 lbs/mm or higher. When the SCS of the catalyst is lower than that value, the catalyst packed into a reactor is destroyed to generate a pressure difference within the reactor, making the continuation of hydrotreating operation impossible. The compacted bulk density (CBD) of the catalyst is preferably from 0.6 g/ml to 1.2 g/ml.

The state of distribution of the active metals in the catalyst according to the present invention is preferably of the uniform type in which the active metals are evenly distributed in the catalyst.

In order to obtain the catalyst according to the present invention having the properties described above, the production method described below is preferably used.

That is, the catalyst is obtained by a method including supporting at least one of Group 6 metals, at least one of Group 9 and 10 metals, phosphorous, and carbon derived from an organic acid in the respective amounts shown above on the composite oxide support composed of the above-described components and having the above-described physical properties using a solution (impregnating solution) containing a compound including at least one of the Group 6 metals, a compound including at least one of the Group 9 and 10 metals, an organic acid, and phosphoric acid, followed by drying.

Specifically, for example, the catalyst is obtained by a method including impregnating the composite oxide support having the above-described physical properties with a solution containing these compounds and drying the obtained support at a temperature of 200° C. or lower. When the composite oxide support is dried at a temperature of 200° C. or lower, highly active desulfurization sites (a CoMoS phase Type II sites, a NiMoS phase Type II sites, and the like) can be precisely controlled without forming inactive metal species of Group 9 and 10 metals such as cobalt and nickel.

Examples of the compound containing a Group 6 metal to be used in the above impregnating solution include molybdenum trioxide, molybdophosphoric acid, ammonium molybdate, and molybdic acid. Molybdenum trioxide and molybdophosphoric acid are preferable. Such compounds are added to the impregnating solution in such an amount that the obtained catalyst contains the Group 6 metal in an amount within the range shown above.

Examples of the compound containing a Group 9 or 10 metal to be used in the above impregnating solution include cobalt carbonate, nickel carbonate, cobalt citrate compounds, nickel citrate compounds, cobalt nitrate hexahydrate, and nickel nitrate hexahydrate. Cobalt carbonate, nickel carbonate, cobalt citrate compounds, and nickel citrate compounds are preferable. Particularly preferable compounds are cobalt citrate compounds and nickel citrate compounds that have a lower decomposition rate as compared with cobalt carbonate and nickel carbonate.

That is, when the decomposition rate is high, the Group 9 or 10 metal such as cobalt or nickel forms an own layer separately from the disulfide layers of the Group 6 metals such as molybdenum disulfide, resulting in insufficient formation of a highly active CoMoS phase, NiMoS phase, or the like. In contrast, when the decomposition rate is low, such a highly active phase can be sufficiently formed at rim-edge parts of the molybdenum disulfide or the like.

Examples of the above cobalt citrate compounds include cobalt (II) citrate ($Co_3(C_6H_5O_7)_2$), cobalt hydrogen citrate ($CoHC_6H_5O_7$), and cobalt citrate oxysalt ($Co_3(C_6H_5O_7)_2 \cdot CoO$). Examples of the nickel citrate compounds include nickelous citrate ($Ni_3(C_6H_5O_7)_2$), nickel hydrogen citrate ($NiHC_6H_5O_7$), and nickel (II) citrate oxysalt ($Ni_3(C_6H_5O_7)_2 \cdot NiO$).

The citrate compounds of cobalt and nickel can be produced in the following manner. In the case of cobalt, the compounds are obtained by dissolving cobalt carbonate in an aqueous solution of citric acid. A citric acid compound obtained by such a manner may be used as it is in catalyst preparation without removing the water therefrom.

The compounds are added to the impregnating solution in such an amount that the obtained catalyst contains the Group 9 or 10 metal in an amount within the range shown hereinabove.

Examples of the organic acid to be used in the impregnating solution include citric acid monohydrate, citric acid anhydride, isocitric acid, malic acid, tartaric acid, oxalic acid, succinic acid, glutaric acid, adipic acid, benzoic acid, phthalic acid, isophthalic acid, salicylic acid, and malonic acid. Citric acid monohydrate is preferable. It is important to use compounds containing substantially no sulfur as the organic acids. When citric acid is used as the organic acid, the citric acid may be in the form of citric acid alone or may be in the form of a citric acid compound with the Group 9 or 10 metal such as cobalt or nickel.

It is important that the organic acid should be added in such an amount that carbon remains in the content as mentioned above in the obtained catalyst. It is advantageous that the amount of the organic acid added with respect to the Group 9 or 10 metal is such that the molar ratio of the [organic acid]/[Group 9 or 10 metal] is from 0.2 to 1.2, preferably from 0.4 to 1, and more preferably from 0.6 to 1. The molar ratio of 0.2 or greater is preferable since active sites attributable to the Group 9 or 10 metal are sufficiently obtained. When the ratio is 1.2 or smaller, the impregnating solution does not have such high viscosity. Thus the time for the supporting step does not take much time and the active metals may fully infiltrate into the inside of the support pellets, so that a well-dispersed state of the active metals is achieved. Thus, this case is preferable.

Furthermore, it is advantageous that the amount of the organic acid added with respect to the total amount of the Group 6 metal and the Group 9 or 10 metal is such that the molar ratio of the [organic acid]/[(Group 6 metal)+(Group 9 or 10 metal)] is from 0.04 to 0.22, preferably from 0.05 to 0.20, and more preferably from 0.05 to 0.18. The molar ratio of 0.35 or smaller is preferable because the excess organic acid which has not formed a complex with the metal does not remain on the surface of the catalyst. When the organic acid remains on the surface of the catalyst, the acid may flow out together with a feedstock oil in the sulfidation step.

Examples of the phosphoric acid to be used in the impregnating solution include various phosphoric acids, specifically, orthophosphoric acid, metaphosphoric acid, pyrophosphoric acid, triphosphoric acid, tetraphosphoric acid, polyphosphoric acid, and the like. Orthophosphoric acid is particularly preferable.

As the phosphoric acid, molybdophosphoric acid may be used, which is a compound with the Group 6 metal.

In this case, when the phosphorus content in the obtained catalyst is lower than the lower limit shown hereinabove, phosphoric acid is further added.

When the compound of the Group 6 metal or the compound of the Group 9 or 10 metal does not sufficiently dissolve in the impregnating solution, an acid [such as nitric acid, or an organic acid (such as citric acid, malic acid or tartaric acid)] may be used together with the compound. An organic acid is preferably used. When an organic acid is used, there are cases in which carbon derived from the organic acid remains in the obtained catalyst. Therefore, it is important to set the carbon content in the catalyst to be within the range shown above.

In the above impregnating solution, the solvent to be used for dissolving the above components is water.

The impregnating solution is prepared by dissolving the respective components mentioned above in the water. At this time, the temperature may be higher than 0° C. to 100° C. or lower. As long as the temperature is within this range, the above respective components can be satisfactorily dissolved in the water.

The pH of the above impregnating solution is preferably lower than 5. When the pH is lower than 5, the amount of hydroxyl ions is not increased and the coordination ability between the organic acid and the Group 9 or 10 metal is strengthened. Thus, formation of a complex of the Group 9 or 10 metal is accelerated. As a result, the number of the active sites for desulfurization (such as a CoMoS phase and a NiMoS phase) can be greatly increased and thus this case is preferable.

The inorganic oxide support is impregnated with the thus-prepared impregnating solution to thereby deposit the above respective components contained in the impregnating solution on the above inorganic oxide support.

The impregnation may be carried out under various conditions. However, typically, the impregnation temperature is preferably higher than 0° C. and lower than 100° C., more preferably from 10° C. to 50° C., and most preferably from 15° C. to 30° C. The impregnation period is preferably from 15 minutes to 3 hours, more preferably from 20 minutes to 2 hours, and most preferably from 30 minutes to 1 hour. When the impregnation temperature is too high, drying may occur during the impregnation, resulting in unevenness of the degree of dispersion. It is preferable to stir the mixture during the impregnation.

After impregnation with the solution, the water content is removed to some degree (to LOI (loss on ignition) of about 50% or lower) at room temperature to about 80° C. in a nitrogen or air stream or in vacuum. Then, drying is carried out in an air or nitrogen stream or in vacuum at a temperature of 200° C. or lower, preferably from 80° C. to 200° C. for a period of 10 minutes to 24 hours, more preferably from 100° C. to 150° C. for a period of 5 hours to 20 hours.

When the drying is carried out at a temperature of 200° C. or lower, the organic acid, which is thought to be in the form of a complex with a metal, is not released from the surface of the catalyst. As a result, it is presumed that it is easy to precisely control the formation of the above active sites (such as a CoMoS phase and NiMoS phase) at the time of sulfidation treatment of the obtained catalyst, and that $Co_9S_8$ species, $Ni_3S_2$, and the like which are inactive species of cobalt and nickel are not formed and the average number of the laminated layers of the Group 6 metal disulfide such as molybdenum disulfide is from 2.5 to 5. Thus, a catalyst having high desulfurization activity is produced and this case is preferable.

However, when the drying is carried out invacuum, the drying is preferably carried out so as to satisfy the above temperature range in terms of pressure at 760 mmHg. The range of the pressure at the drying is from 300 mmHg to 900 mmHg, preferably from 700 mmHg to 850 mmHg, more preferably from 730 mmHg to 800 mmHg, and most preferably atmospheric pressure. When the pressure at the time of drying is 300 mmHg or higher, the boiling point does not become than 200° C. in terms of pressure at 760 mmHg, so that the organic acid which is in the form of a complex with a metal is not easily released. The organic acid, which is thought to be in the form of a complex with a metal, is not released from the surface of the catalyst. As a result, it is easy to precisely control the formation of the above active sites (such as a CoMoS phase and a NiMoS phase) in the sulfidation of the obtained catalyst, and $Co_9S_8$ species, $Ni_3S_2$, and the like, which are inactive species of cobalt and nickel, are not formed. Thus, a catalyst having high desulfurization activity is produced and hence this case is preferable.

<Hydrotreating Method Using Hydrodesulfurization Catalyst>

The catalyst according to the present invention can be used in a hydrotreating for diesel oil similar to other desulfurization catalysts. The catalyst according to the present invention has very high desulfurization activity and when almost the same reaction conditions are used as the reaction conditions at the time of hydrotreating of the related art and milder reaction conditions are used, a sulfur content in a diesel oil fraction can be significantly reduced.

For example, a diesel oil fraction containing sulfur compounds is brought into contact with the catalyst according to the present invention under conditions of a hydrogen partial pressure of 3 MPa to 8 MPa, a temperature of 300° C. to 420° C., and a liquid hourly space velocity of 0.3 hr$^{-1}$ to 5 hr$^{-1}$, to desulfurize the diesel oil fraction and thereby reduce the sulfur compounds including components difficult to desulfurize, which are contained in the diesel oil.

Examples of oils (feedstock oil) to be hydrotreated by the catalyst according to the present invention include diesel oil fractions such as straight-run diesel oil, catalytically cracked diesel oil, thermally cracked gas oil, hydrotreated diesel oil, desulfurized diesel oil, and vacuum distillation gas oil (VGO). Representative examples of properties of such feedstock oils include a boiling point range from 150° C. to 450° C. and a sulfur content of 5% by mass or lower.

For carrying out the hydrotreating method using the catalyst according to the present invention on a commercial scale, a fixed-bed, moving-bed, or fluidized-bed type catalyst layer of the catalyst according to the present invention may be formed in a reactor. Then, the hydrotreating may be accomplished by introducing a feedstock oil into this reactor and reacting the oil under the above-described conditions. Most commonly, a fixed-bed catalyst layer is formed in a reactor. A feedstock oil is introduced into an upper part of the reactor and passed through the fixed bed from the upper to the lower side thereof and the product oil is discharged from a lower part of the reactor. However, a feedstock oil is introduced into a lower part of the reactor and passed through the fixed bed from the lower to the upper and side thereof and the product oil is discharged from an upper part of the reactor.

The hydrotreating method may be a single-stage hydrotreatment method in which the treatment is carried out in a single reactor packed with the catalyst according to the present invention, or may be a multistage successive hydrotreatment method in which several reactors packed with the catalyst are used to carry out the treatment.

Before being used (that is, before performing the hydrotreating method), the catalyst according to the present invention is activated by sulfidation in the reactor. The sulfidation treatment is carried out using a sulfur compound-containing petroleum distillate and, added thereto, a sulfidizing agent such as dimethyl disulfide or carbon disulfide, or using hydrogen sulfide at a temperature of 200° C. to 400° C., and preferably 250° C. to 350° C. under a hydrogen atmosphere having a hydrogen partial pressure of ordinary pressure or higher. Through the above-described sulfidation treatment, the catalyst according to the present invention forms laminated layers of the Group 6 metal disulfide such as molybdenum disulfide having an average laminated layer number of 2.5 to 5 and an average in-plane-direction length of 1 nm to 3.5 nm. Also, the catalyst forms highly active sites of a CoMoS phase, NiMoS phase, and the like formed in rim-edge parts of the molybdenum disulfide or the like.

EXAMPLES

Next, the embodiments and the effects of the present invention will be described more specifically with reference to Examples and Comparative Examples but the present invention is not limited to the following Examples.

First, a method of analyzing the physical properties and chemical compositions of catalysts in Examples and Comparative Examples will be shown below.

<Specific Surface Area>

The specific surface area was measured by a BET method based on nitrogen adsorption. As a nitrogen adsorption apparatus, a surface area measuring apparatus (Belsorp 28) manufactured by Bell Japan Corporation was used.

<Pore Volume, Average Pore Diameter and Pore Distribution>(Equipment Used)

The pore volume, average pore diameter, and pore distribution were measured by the mercury penetration method. As an apparatus for mercury penetration, a porosimeter (MICROMERITICS AUTO-PORE 9200; manufactured by SHIMADZU CORPORATION) was used.

(Measurement Principle)

The mercury penetration method is based on the laws of capillary action. In the case of mercury and cylindrical pores, the laws are expressed by the following equation (F). In the equation (F), D represents a pore diameter, P represents applied pressure, γ represents surface tension, and θ represents a contact angle. As a function of applied pressure P, the volume of mercury penetrating into the pores was measured. The surface tension of the mercury in the pores of the catalyst was set to 484 dyne/cm and the contact angle was set to 130 degrees.

$$D = -(1/P)4\gamma \cos\theta \qquad \text{Equation (F):}$$

The pore volume is the total volume of mercury penetrated into the pores per gram of catalyst. The average pore diameter is an average value of Ds calculated as a function of P.

The pore distribution is a distribution of D calculated as a function of P.

(Measurement Procedure)

(1) A vacuum heating degassing apparatus was turned on and it was confirmed that a temperature was 400° C. and a degree of vacuum was 5×10$^{-2}$ Torr or lower.

(2) An empty sample burette was put into the vacuum heating degassing apparatus.

(3) When the degree of vacuum was 5×10$^{-2}$ Torr or lower, the sample burette was corked, taken out from the vacuum heating degassing apparatus, and then cooled to measure the weight.

(4) The sample burette was filled with a sample (catalyst).

(5) The sample burette filled with the sample was put into the vacuum heating degassing apparatus and held for 1 hour or longer after the degree of vacuum reached 5×10$^{-2}$ Torr or lower.

(6) The sample burette filled with the sample was taken out from the vacuum heating degassing apparatus and cooled and the weight was measured to obtain the weight of the sample.

(7) The sample was put into a cell for an AUTO-PORE 9200.

(8) Measurement was performed by the AUTO-PORE 9200.

<Chemical Composition Analysis>(Equipment Used and Analysis Method)

The analysis of metal in the catalyst was carried out by using an inductively coupled plasma emission spectrophotometer (ICPS-2000; manufactured by SHIMADZU CORPORATION).

The amount of the metal was determined by an absolute calibration curve method.

(Measurement Procedure)

(1) 0.05 g of a catalyst, 1 ml of hydrochloric acid (50% by volume), a drop of hydrofluoric acid and 1 ml of pure water were added to a Uniseal and the mixture was heated for dissolution.

(2) The mixture was dissolved and then transferred to a polypropylene measuring flask (50 ml). Pure water was added thereto and 50 ml of the resultant was weighted.

(3) This solution was measured with an ICPS-2000.

<Measurement of Molybdenum Disulfide Layers (using TEM)>

The number of molybdenum disulfide laminating layers was determined with a transmission electron microscope (TEM) (trade name "JEM-2010", manufactured by JEOL Ltd.) in the following manner.

(1) A catalyst was packed into a flow-through type reaction tube. The catalyst packed was held at room temperature in a nitrogen stream for 5 minutes, and the surrounding gas was replaced with a mixture of $H_2S$ (5% by volume) and $H_2$. The catalyst was heated at a rate of 5° C./min. After the catalyst temperature reached 400° C., the catalyst was held for 1 hour and then cooled to 200° C. under the same atmosphere. Subsequently, the surrounding gas was replaced with nitrogen and the catalyst was cooled to room temperature to complete a sulfidation treatment.

(2) The catalyst after the sulfidation treatment was pulverized in an agate mortar.

(3) A small portion of the pulverized catalyst was dispersed in acetone.

(4) The obtained suspension was dropped onto a microgrid and dried at room temperature to obtain a sample.

(5) The sample was set on the measurement part of the TEM and measured at an accelerating voltage of 200 kV. The direct magnification was 200,000 diameters, and five fields of view were examined.

(6) Each photograph was enlarged so as to result in a magnification of 2,000,000 diameters (size: 16.8 cm×16.8 cm). The number of the molybdenum disulfide laminated layers and the in-plane-direction length of the layer were measured with the knowledge that 200 or more crystal grains of a Group 6 metal disulfide, such as molybdenum disulfide, per field were visually recognizable.

Preparation Example 1

Preparation of Zeolite

Zeolite 1 used in the following Examples and the like was prepared in the following manner.

29 g of sodium aluminate containing 17.0% by mass of $Na_2O$ and 22.0% by mass of $Al_2O_3$ was added to 230 g of an aqueous solution of 21.7% by mass of sodium hydroxide in an autoclave vessel while stirring. The sodium aluminate-added solution was added into 232 g of No. 3 water glass having a $SiO_2$ concentration of 24% by mass while stirring. The mixture was sufficiently stirred and then heated and matured at 95° C. for 12 hours. After maturing was completed, cooling was carried out so that the temperature reached 70° C. or lower. Then, synthesized products were removed and filtering, washing, and drying were carried out to prepare Na—Y type seed crystals. The composition of the obtained seed crystal was $Na_2O/Al_2O_3$=16, $SiO_2/Al_2O_3$=15, $H_2O/Al_2O_3$=330 at an oxide molar ratio.

Next, 220 g of a sodium silicate solution having a $SiO_2$ concentration of 29% by mass, 31.7 g of sodium aluminate containing 33.0% by mass of $Na_2O$ and 36.5% by mass of $Al_2O_3$, 6 g of sodium hydroxide, and 747.0 g of pure water were put into the autoclave vessel and the mixture was sufficiently stirred. Then, 8.0 g (on a dry weight basis) of the seed crystals was added thereto and the mixture was sufficiently stirred again. Thereafter, the mixture was heated and matured at 95° C. for 12 hours. After the maturing was completed, cooling was performed so that the temperature reached 70° C. or lower. After cooling, synthesized products were removed followed by filtering, washing, and drying to obtain Na—Y type zeolite 1.

Thereafter, the Na—Y type zeolite 1 was put into an aqueous solution of 5% by mass of ammonium nitrate and stirred at 60° C. for 20 minutes under a constant condition, followed by filtering and ion exchange treatment. The ion exchange treatment was repeated twice and then the resultant was dried at 120° C. for 12 hours to obtain $NH_3$ type Y zeolite 1.

Further, the obtained $NH_3$ type Y zeolite 1 was calcined at 600° C. for 4 hours under air circulation to obtain an H type Y zeolite 1 (hereinafter, simply referred to as "Zeolite 1"). In addition, the amount of the aforementioned seed $Al_2O_3$ with respect to total $Al_2O_3$ in a reaction mixture was 0.098% by mole.

Zeolites 2 to 5 were prepared in the same method as the preparation method of Zeolite 1.

The $SiO_2/Al_2O_3$ (molar ratio), the crystal lattice constant, the molar ratio of Al in the zeolite framework with respect to total Al ([Al in zeolite framework]/[total Al]) and the crystallite diameter of each of Zeolites 1 to 5 are shown in Table 1.

Here, the $SiO_2/Al_2O_3$ (molar ratio) was measured form chemical composition analysis though ICP spectroscopy. The crystal lattice constant was measured according to ASTM D3906 using an X-ray diffraction apparatus (XRD). The molar ratio of Al atoms in the zeolite framework with respect to total Al atoms was calculated from a value obtained by measuring a chemical composition analytical value and XRD. The details thereof are as follows.

TABLE 1

| | $SiO_2/Al_2O_3$ (molar ratio) | Crystal lattice constant (nm) | [Al in zeolite framework]/ [total Al] | Crystallite diameter (nm) |
|---|---|---|---|---|
| Zeolite 1 | 5.6 | 2.442 | 0.32 | 93 |
| Zeolite 2 | 5.8 | 2.452 | 0.56 | 90 |
| Zeolite 3 | 6.0 | 2.439 | 0.28 | 50 |
| Zeolite 4 | 6.0 | 2.439 | 0.28 | 35 |
| Zeolite 5 | 5.8 | 2.441 | 0.31 | 118 |

Example 1

3.4 g of Zeolite 1 and 218.8 g of alumina hydrate were kneaded, extrusion-molded and then calcined at 600° C. for 2 hours to obtain a zeolite-alumina composite support in the form of cylindrical moldings having a diameter of 1/16 inch (zeolite/alumina mass ratio=6/94, pore volume=0.82 ml/g, specific surface area=321 m²/g, average pore diameter=8.9 nm).

Separately, 17.09 g of cobaltous citrate and 3.72 g of phosphoric acid (85% aqueous solution) were added to 43.4 g of ion exchange water followed by heating to 80° C. and stirring for 10 minutes. Next, 29.34 g of molybdophosphoric acid was added thereto and dissolved, followed by stirring at the same temperature for 15 minutes to prepare a solution for impregnation (impregnating solution).

Into an eggplant type flask was introduced 50.0 g of the above zeolite-alumina composite support. The entire amount of the above impregnating solution was added thereto with a pipet and the support was immersed in the solution at about 25° C. for 3 hours. Then, the support was air-dried in a nitrogen stream and then dried in a muffle furnace at 120° C. for about 16 hours to obtain Catalyst A.

In Catalyst A, the specific surface area was 147 m²/g, the pore volume was 0.44 ml/g and the average pore diameter was 12.0 nm.

Example 2

A zeolite-alumina composite support (zeolite/alumina mass ratio=6/94, pore volume=0.79 ml/g, specific surface area=329 m$^2$/g, average pore diameter=8.8 nm) having the same shape as in Example 1 was obtained in the same manner as in Example 1 except that Zeolite 1 of Example 1 was changed to Zeolite 2. Into an eggplant type flask was introduced 50 g of the zeolite-alumina composite support, the entire amount of the same impregnating solution as in Example 1 was added thereto and the support was immersed in the solution in the same manner as in Example 1. Then, the support was air-dried, dried, and calcined in the same manner as in Example 1 to obtain Catalyst B.

In Catalyst B, the specific surface area was 155 m$^2$/g, the pore volume was 0.41 ml/g and the average pore diameter was 12.5 nm.

Example 3

A zeolite-alumina composite support (zeolite/alumina mass ratio=6/94, pore volume=0.81 ml/g, specific surface area=317 m$^2$/g, average pore diameter=8.7 nm) having the same shape as in Example 1 was obtained in the same manner as in Example 1 except that Zeolite 1 of Example 1 was changed to Zeolite 3. Into an eggplant type flask was introduced 50 g of the zeolite-alumina composite support, the entire amount of the same impregnating solution as in Example 1 was added thereto and the support was immersed in the solution in the same manner as in Example 1. Then, the support was air-dried, dried, and calcined in the same manner as in Example 1 to obtain Catalyst C.

In Catalyst C, the specific surface area was 157 m$^2$/g, the pore volume was 0.42 ml/g and the average pore diameter was 12.1 nm.

Example 4

A zeolite-alumina composite support (zeolite/alumina mass ratio=6/94, pore volume=0.79 ml/g, specific surface area=315 m$^2$/g, average pore diameter=8.5 nm) having the same shape as in Example 1 was obtained in the same manner as in Example 1 except that Zeolite 1 of Example 1 was changed to Zeolite 4. Into an eggplant type flask was introduced 50 g of the zeolite-alumina composite support, the entire amount of the same impregnating solution as in Example 1 was added thereto and the support was immersed in the solution in the same manner as in Example 1. Then, the support was air-dried, dried, and calcined in the same manner as in Example 1 to obtain Catalyst D.

In Catalyst D, the specific surface area was 150 m$^2$/g, the pore volume was 0.41 ml/g and the average pore diameter was 12.2 nm.

Example 5

7.56 g of cobalt carbonate, 21.4 g of molybdenum trioxide, 12.02 g of citric acid monohydrate, and 5.16 g of phosphoric acid (85% aqueous solution) were added to 43.2 g of of ion-exchanged water, followed by heating to 80° C. and stirring for 30 minutes to prepare an impregnating solution.

Into an eggplant type flask was introduced 50 g of a zeolite-alumina composite support prepared in the same manner as in Example 2. The entire amount of the above impregnating solution was added thereto with a pipet and the support was immersed in the solution at about 25° C. for 3 hours. Then, the support was air-dried in a nitrogen stream and then dried in a muffle furnace at 120° C. for about 16 hours to obtain Catalyst E.

In Catalyst E, the specific surface area was 149 m$^2$/g, the pore volume was 0.43 ml/g and the average pore diameter was 11.8 nm.

Example 6

7.56 g of cobalt carbonate, 21.4 g of molybdenum trioxide, 4.41 g of citric acid monohydrate, and 5.16 g of phosphoric acid (85% aqueous solution) were added to 43.2 g of ion-exchanged water, followed by heating to 80° C. and stirring for 30 minutes to prepare an impregnating solution.

Into an eggplant type flask was introduced 50 g of a zeolite-alumina composite support prepared in the same manner as in Example 2. The entire amount of the above impregnating solution was added thereto with a pipet and the support was immersed in the solution at about 25° C. for 3 hours. Then, the support was air-dried in a nitrogen stream and then dried in a muffle furnace at 120° C. for about 16 hours to obtain Catalyst F.

In Catalyst F, the specific surface area was 146 m$^2$/g, the pore volume was 0.43 ml/g and the average pore diameter was 12.8 nm.

Comparative Example 1

A zeolite-alumina composite support (zeolite/alumina mass ratio=6/94, pore volume=0.81 ml/g, specific surface area=312 m$^2$/g, average pore diameter=8.6 nm) having the same shape as in Example 1 was obtained in the same manner as in Example 1 except that Zeolite 1 of Example 1 was changed to Zeolite 5. Into an eggplant type flask was introduced 50 g of the zeolite-alumina composite support, the entire amount of the same impregnating solution as in Example 1 was added thereto and the support was immersed in the solution in the same manner as in Example 1. Then, the support was air-dried, dried, and calcined in the same manner as in Example 1 to obtain Catalyst a.

In Catalyst a, the specific surface area was 145 m$^2$/g, the pore volume was 0.44 ml/g and the average pore diameter was 12.0 nm.

Comparative Example 2

7.56 g of cobalt carbonate, 21.4 g of molybdenum trioxide, 17.36 g of citric acid monohydrate, and 5.16 g of phosphoric acid (85% aqueous solution) were added to 43.2 g of ion-exchanged water, followed by heating to 80° C. and stirring for 30 minutes to prepare an impregnating solution.

Into an eggplant type flask was introduced 50 g of a zeolite-alumina composite support prepared in the same manner as in Example 2. The entire amount of the above impregnating solution was added thereto with a pipet and the support was immersed in the solution at about 25° C. for 3 hours. Then, the support was air-dried in a nitrogen stream and then dried in a muffle furnace at 120° C. for about 16 hours to obtain Catalyst b.

In Catalyst b, the specific surface area was 154 m$^2$/g, the pore volume was 0.42 ml/g and the average pore diameter was 12.9 nm.

Comparative Example 3

7.56 g of cobalt carbonate, 21.4 g of molybdenum trioxide, 1.34 g of citric acid monohydrate, and 5.16 g of phosphoric acid (85% aqueous solution) were added to 43.2 g of ion-exchanged water, followed by heating to 80° C. and stirring for 30 minutes to prepare an impregnating solution.

Into an eggplant type flask was introduced 50 g of a zeolite-alumina composite support prepared in the same manner as in Example 2. The entire amount of the above impregnating solution was added thereto with a pipet and the support was immersed in the solution at about 25° C. for 3 hours. Then, the support was air-dried in a nitrogen stream and then dried in a muffle furnace at 120° C. for about 16 hours to obtain Catalyst c.

In Catalyst c, the specific surface area was 160 m²/g, the pore volume was 0.44 ml/g and the average pore diameter was 11.7 nm.

Comparative Example 4

10.41 g of cobalt carbonate, 22.1 g of molybdenum trioxide, 3.13 g of citric acid monohydrate, and 5.30 g of phosphoric acid (85% aqueous solution) were added to 43.2 g of ion-exchanged water, followed by heating to 80° C. and stirring for 30 minutes to prepare an impregnating solution.

Into an eggplant type flask was introduced 50 g of a zeolite-alumina composite support prepared in the same manner as in Example 2. The entire amount of the above impregnating solution was added thereto with a pipet and the support was immersed in the solution at about 25° C. for 3 hours. Then, the support was air-dried in a nitrogen stream and then dried in a muffle furnace at 120° C. for about 16 hours to obtain Catalyst d.

In Catalyst d, the specific surface area was 159 m²/g, the pore volume was 0.43 ml/g and the average pore diameter was 11.6 nm.

The element analytical values of Catalysts A to F and Catalysts a to d are shown in Table 2 and the properties of the catalysts are shown in Table 3. In Table 2, CoO, MoO₃, and P₂O₅ are values in terms of an oxide based on the catalyst and C is a value in terms of an element based on the catalyst. In addition, in Table 3, "SA" refers to a specific surface area (m²/g), "PV" refers to a pore volume (ml/g), "MPD" refers to an average pore diameter (nm), and "PSD" refers to a pore distribution (what percentage of the pore volume of the total pore volume is included in MPD±1.5 nm) (%), respectively.

TABLE 2

|  | Support (Based on support, % by mass) | | Supporting material (Based on catalyst, % by mass) | | | | Mass ratio | Molar ratio |
| --- | --- | --- | --- | --- | --- | --- | --- | --- |
|  | Zeolite type | Zeolite amount | CoO | MoO₃ | P₂O₅ | C | P₂O₅/MoO₃ | Organic acid/Co |
| Example 1 Catalyst A | Zeolite 1 | 6 | 6.1 | 26.8 | 4.1 | 3.8 | 0.15 | 0.65 |
| Example 2 Catalyst B | Zeolite 2 | 6 | 5.9 | 26.3 | 3.9 | 3.7 | 0.15 | 0.65 |
| Example 3 Catalyst C | Zeolite 3 | 6 | 5.8 | 26.5 | 3.8 | 3.6 | 0.14 | 0.65 |
| Example 4 Catalyst D | Zeolite 4 | 6 | 6.0 | 26.3 | 4.3 | 3.8 | 0.16 | 0.66 |
| Example 5 Catalyst E | Zeolite 2 | 6 | 5.9 | 27.1 | 4.1 | 5.3 | 0.15 | 0.94 |
| Example 6 Catalyst F | Zeolite 2 | 6 | 5.7 | 26.2 | 4.1 | 1.8 | 0.16 | 0.33 |
| Comparative Example 1 Catalyst a | Zeolite 5 | 6 | 6.1 | 26.7 | 4.2 | 3.9 | 0.16 | 0.67 |
| Comparative Example 2 Catalyst b | Zeolite 2 | 6 | 6.0 | 26.6 | 3.8 | 7.4 | 0.14 | 1.28 |
| Comparative Example 3 Catalyst c | Zeolite 2 | 6 | 6.1 | 26.8 | 3.9 | 0.6 | 0.15 | 0.10 |
| Comparative Example 4 Catalyst d | Zeolite 2 | 6 | 8.0 | 26.8 | 3.9 | 1.3 | 0.15 | 0.17 |

TABLE 3

|  | Physical properties | | | | TEM | |
| --- | --- | --- | --- | --- | --- | --- |
|  | SA (m²/g) | PV (ml/g) | MPD (nm) | PSD ± 1.5 nm (%) | Average number of laminated layers | Average in-plane-direction length (nm) |
| Catalyst A | 147 | 0.44 | 12.0 | 46 | 3.6 | 2.9 |
| Catalyst B | 155 | 0.41 | 12.5 | 42 | 3.8 | 2.8 |
| Catalyst C | 157 | 0.42 | 12.1 | 47 | 3.5 | 3.3 |
| Catalyst D | 150 | 0.41 | 12.2 | 48 | 3.1 | 3.1 |
| Catalyst E | 149 | 0.43 | 11.8 | 45 | 3.7 | 3.1 |

TABLE 3-continued

| | Physical properties | | | | TEM | |
|---|---|---|---|---|---|---|
| | SA ($m^2$/g) | PV (ml/g) | MPD (nm) | PSD ± 1.5 nm (%) | Average number of laminated layers | Average in-plane-direction length (nm) |
| Catalyst F | 146 | 0.43 | 12.8 | 47 | 3.7 | 3.0 |
| Catalyst a | 145 | 0.44 | 12.0 | 46 | 3.0 | 3.5 |
| Catalyst b | 154 | 0.42 | 12.9 | 43 | 3.3 | 3.4 |
| Catalyst c | 160 | 0.44 | 11.7 | 50 | 2.4 | 3.5 |
| Catalyst d | 159 | 0.43 | 11.6 | 47 | 3.2 | 3.4 |

[Hydrotreating Reaction 1 of Straight-Run Diesel Oil]

Using Catalysts A to F and Catalysts a to d prepared in Examples 1 to 6 and Comparative Examples 1 to 4, a hydrotreating for straight-run diesel oil having the following properties was carried out in the following manner.

First, the catalyst was packed into a high-pressure flow-through type reactor to form a fixed-bed catalyst layer, which was pretreated under the following conditions.

Next, a fluid mixture of the feedstock oil and a hydrogen-containing gas which had been heated to the reaction temperature was introduced through an upper part of the reactor to allow a hydrotreating reaction to proceed under the following conditions. A fluid mixture of a product oil and gases was discharged through a lower part of the reactor, and the product oil was separated with a gas/liquid separator.

Pretreatment Conditions of Each Catalyst: Pressure (hydrogen partial pressure); 5.0 MPa, Atmosphere; Hydrogen and the feedstock oil (liquid hourly space velocity: 1.5 $h^{-1}$, hydrogen/oil ratio, 200 $m^3$ (normal)/$m^3$), Temperature; Introduction of hydrogen and the feedstock oil at about 22° C., elevation at a rate of 20° C./hr, holding at 300° C. for 24 hours, and subsequent elevation to a reaction temperature of 350° C. at a rate of 20° C./hr.

Hydrogenation Reaction Conditions: Reaction temperature; 350° C., Pressure (hydrogen partial pressure); 5.0 MPa, Liquid hourly space velocity; 1.5 $h^{-1}$, Hydrogen/oil ratio: 200 $m^3$ (normal)/$m^3$ Properties of Feedstock Oil: Type of oil; straight-run diesel oil from Middle East, Specific gravity (15/4° C.); 0.8603, Distillation properties; Initial distillation point of 227.5° C., 50% point of 308.5° C., 90% point of 360.5° C., end point of 385.0° C., Sulfur content; 1.57% by mass, Nitrogen content; 160 ppm by mass, Dynamic viscosity at 30° C.: 6.441 cSt, Pour point; 0° C., Cloud point; 1.0° C., Saybolt color: −16

The reaction results were analyzed by the following method.

The reactor was operated at 360° C. After six days had passed, the product oil was sampled and properties thereof were analyzed. Then, the reactor was operated using each catalyst for 200 days at a temperature at which the sulfur content of the production oil was 8 ppm by mass. In order to inhibit an increase in the sulfur content of the product oil caused by deterioration of the catalyst during the product oil sulfur content constant operation, the reactor was operated while correcting the reaction temperature.

[1] Degree of Desulfurization (HDS) (%):

The sulfur content which have disappeared from the feedstock oil through conversion to hydrogen sulfide by desulfurization reaction was defined as a degree of desulfurization. The degree of desulfurization was calculated from the analytical values of sulfur content in the feedstock oil and product oil in accordance with the following equation. The measurement results are shown in Table 4.

[2] Desulfurization Reaction Rate Constant (Ks):

The constant of a reaction rate equation which gives the 1.3 order of reaction with respect to a decrease in the sulfur content of the product oil (Sp) was determined as a desulfurization reaction rate constant (Ks). Also, the higher the reaction rate constant is, the more excellent the catalytic activity is. The measurement results are shown in Table 4.

Degree of desulfurization (%)=[(Sf−Sp)/Sf]×100

Desulfurization reaction rate constant=[1/$(Sp)^{(1.3-1)}$−1 $(Sf)^{(1.3-1)}$]×(LHSV)×1/(1.3−1)

In the above equations as for degree of desulfurization and desulfurization reaction rate constant, Sf represents a sulfur content in a feedstock oil (% by mass), Sp represents a sulfur content in a product oil (% by mass), and LHSV represents a liquid hourly space velocity ($hr^{-1}$).

[3] Specific Activity (%):

The specific activity was obtained from the following equation. The measurement results are shown in Table 4.

Specific activity (%)=[each desulfurization reaction rate constant]/[desulfurization reaction rate constant of Comparative Catalyst a])×100

TABLE 4

| | Sulfur content of product oil (ppm by mass) | Desulfurization reaction rate constant (Ks) | Specific activity (%) |
|---|---|---|---|
| Example 1 (Catalyst A) | 7 | 39.2 | 175 |
| Example 2 (Catalyst B) | 6 | 41.9 | 187 |
| Example 3 (Catalyst C) | 11 | 34.1 | 152 |
| Example 4 (Catalyst D) | 15 | 31.2 | 139 |
| Example 5 (Catalyst E) | 7 | 39.5 | 176 |
| Example 6 (Catalyst F) | 9 | 36.1 | 161 |
| Comparative Example 1 (Catalyst a) | 37 | 22.4 | 100 |
| Comparative Example 2 (Catalyst b) | 25 | 25.8 | 115 |
| Comparative Example 3 (Catalyst c) | 68 | 17.9 | 80 |
| Comparative Example 4 (Catalyst d) | 29 | 24.4 | 109 |

As shown in Table 4, in Catalysts A to F in Examples 1 to 6, the degree of desulfurization was high, the desulfurization reaction rate constant was large, and the specific activity was 139% or higher and was very high compared to Catalysts a to d in Comparative Examples 1 to 4. In the case of using Catalysts a to d, the sulfur content was from 25 ppm by mass to 68 ppm by mass. However, in the case of using Catalysts A to F, the sulfur content could be decreased to 15 ppm by mass or lower.

Particularly, when comparing Catalyst A with Catalyst a, the active components are supported using the same impregnating solution. However, the desulfurization reaction rate constant of Catalyst A is apparently larger than the desulfurization reaction rate constant of Catalyst a and thus it is found the crystallite diameter of zeolite contained in the catalyst influences the desulfurization reaction rate constant of the catalyst. In addition, since all Catalyst A to F exhibit high desulfurization activity, it is understood that when the crystallite diameter of zeolite in each of the catalysts is set to 30 nm to 100 nm, a hydrodesulfurization catalyst having high activity can be produced.

Further, irrespective of supporting of the same inorganic oxide support, Catalyst b in which 1.28 moles of organic acid per 1 mole of cobalt is supported, Catalyst c in which only 0.1 mole of organic acid per 1 mole of cobalt is supported, and Catalyst d in which only 0.17 moles of organic acid per 1 mole of cobalt is supported exhibit apparently lower specific activity than that of Catalysts B, E and F in which 0.3 moles to 1.0 mole of organic acid per 1 mole of cobalt is supported. From these results, it is understood that the molar ratio with respect to the amount of organic acid supported on the support, particularly, the amount of the supported Group 9 or 10 metal, significantly influences desulfurization activity and the organic acid and the Group 9 or 10 metal are supported such that the amount of carbon derived from the organic acid in terms of an element based on the catalyst is from 0.8% by mass to 7% by mass, and the molar ratio of [organic acid]/[Group 9 or 10 metal] is from 0.2 to 1.2, so that a hydrodesulfurization catalyst which makes carrying out a hydrotreating for relatively heavy diesel oil with high desulfurization activity possible can be obtained.

Further, in Table 5, even after 50 days had passed, the operation temperature after 100 days was shown. In Comparative Examples 1 (Catalyst a) and Comparative Examples 4 (Catalyst d), the operation temperature reached 400° C. before 100 days has passed. Further, in Comparative Examples 3 (Catalyst c), the operation temperature reached 400° C. before 50 days has passed. Thus, the evaluation was stopped.

As a result, in the case of using Catalysts A to F in Examples 1 to 6, the difference between the operation temperature on the $50^{th}$ day and the operation temperature on the $100^{th}$ day was from 5° C. to 12° C. Even in the case of product oil sulfur content constant operation for a long period of time, it was not necessary to considerably raise the operation temperature. In contrast, in the case of using Catalyst b in Comparative Example 2, it is necessary to raise the operation temperature on the $100^{th}$ day from the operation temperature on the $50^{th}$ day by 17° C. or more. From these results, it is found that the catalyst according to the present invention can maintain stable activity over a long period of time.

TABLE 5

| | Operation temperature on $50^{th}$ day (° C.) | Operation temperature on $100^{th}$ day (° C.) |
|---|---|---|
| Example 1 (Catalyst A) | 357 | 364 |
| Example 2 (Catalyst B) | 354 | 359 |

TABLE 5-continued

| | Operation temperature on $50^{th}$ day (° C.) | Operation temperature on $100^{th}$ day (° C.) |
|---|---|---|
| Example 3 (Catalyst C) | 364 | 374 |
| Example 4 (Catalyst D) | 368 | 380 |
| Example 5 (Catalyst E) | 357 | 363 |
| Example 6 (Catalyst F) | 361 | 370 |
| Comparative Example 1 (Catalyst a) | 386 | 400 or higher |
| Comparative Example 2 (Catalyst b) | 379 | 396 |
| Comparative Example 4 (Catalyst d) | 382 | 400 or higher |

As is apparent from the results given above, it is understood that the catalyst according to the present invention has excellent activity in desulfurization reaction of diesel oil in the ultra-deep desulfurization region under about the same conditions as the reaction conditions such as hydrogen partial pressure and reaction temperature, as in the case of a hydrotreating for diesel oil of the related art.

INDUSTRIAL APPLICABILITY

The present invention relates to a hydrodesulfurization catalyst capable of being produced by a simple method and capable of realizing the ultra-deep desulfurization of a sulfur content in diesel oil without requiring severer operating conditions and to provide a hydrotreating method for diesel oil using the hydrodesulfurization catalyst.

The invention claimed is:

1. A hydrodesulfurization catalyst for diesel oil which supports one or more metals selected from the group consisting of elements in Group 6 of the long periodic table, one or more metals selected from the group consisting of elements in Group 9 or 10 of the long periodic table, phosphorus, and an organic acid on a composite oxide support containing 80% by mass to 99.5% by mass of alumina, and 0.5% by mass to 20% by mass of HY zeolite, the catalyst comprising:
    10% by mass to 40% by mass of one or more metals selected from the group consisting of elements in Group 6 in terms of an oxide based on the catalyst;
    1% by mass to 15% by mass of one or more metals selected from the group consisting of elements in Group 9 or 10 in terms of an oxide based on the catalyst;
    1.5% by mass to 8% by mass of phosphorus in terms of an oxide based on the catalyst;
    0.8% by mass to 7% by mass of carbon derived from the organic acid in terms of an element based on the catalyst; and
    0.2 moles to 1.2 moles of the organic acid per 1 mole of one or more metals selected from the group consisting of elements in Group 9 or 10 of the long periodic table,
    wherein a specific surface area measured by a nitrogen adsorption method is from 110 m$^2$/g to 300 m$^2$/g,
    a pore volume measured by a mercury penetration method is from 0.3 ml/g to 0.6 ml/g,
    an average pore diameter measured by a mercury penetration method is from 6.5 nm to 14 nm, and
    the HY zeolite has (a) a SiO$_2$/Al$_2$O$_3$ (molar ratio) of 3 to 10, (b) a crystal lattice constant of 2.435 nm to 2.465 nm, (c) a molar ratio of Al in the zeolite framework to total Al of 0.2 to 0.9, and (d) a crystallite diameter of 30 nm to 100 nm.

2. A hydrotreating method for diesel oil comprising:
subjecting a diesel oil fraction to a catalytic reaction under the presence of the hydrodesulfurization catalyst according to claim 1.

3. A method for producing a hydrodesulfurization catalyst, wherein the method comprises impregnating a composite oxide support containing 80% by mass to 99.5% by mass of alumina, and 0.5% by mass to 20% by mass of HY zeolite with a solution containing one or more metals selected from the group consisting of elements in Group 6 of the long periodic table, one or more metals selected from the group consisting of elements in Group 9 or 10 of the long periodic table, phosphorus, and an organic acid, followed by drying at a temperature of 200° C. or lower,
  wherein the hydrodesulfurization catalyst supports the one or more metals and wherein the hydrodesulfurization catalyst comprises:
  10% by mass to 40% by mass of one or more metals selected from the group consisting of elements in Group 6 in terms of an oxide based on the catalyst;
  1% by mass to 15% by mass of one or more metals selected from the group consisting of elements in Group 9 or 10 in terms of an oxide based on the catalyst;
  1.5% by mass to 8% by mass of phosphorus in terms of an oxide based on the catalyst;
  0.8% by mass to 7% by mass of carbon derived from the organic acid in terms of an element based on the catalyst; and
  0.2 moles to 1.2 moles of the organic acid per 1 mole of one or more metals selected from the group consisting of elements in Group 9 or 10 of the long periodic table,
  wherein a specific surface area measured by a nitrogen adsorption method is from 110 m$^2$/g to 300 m$^2$/g,
  a pore volume measured by a mercury penetration method is from 0.3 ml/g to 0.6 ml/g,
  an average pore diameter measured by a mercury penetration method is from 6.5 nm to 14 nm, and
  wherein the HY zeolite has (a) a $SiO_2/Al_2O_3$ (molar ratio) of 3 to 10, (b) a crystal lattice constant of 2.435 nm to 2.465 nm, (c) a molar ratio of Al in the zeolite framework to total Al of 0.2 to 0.9, and (d) a crystallite diameter of 30 nm to 100 nm.

* * * * *